INVENTOR
PASQUALE DI BENEDETTO

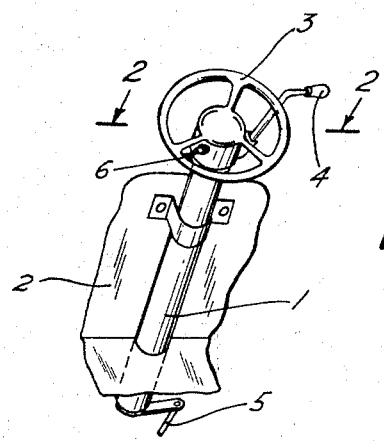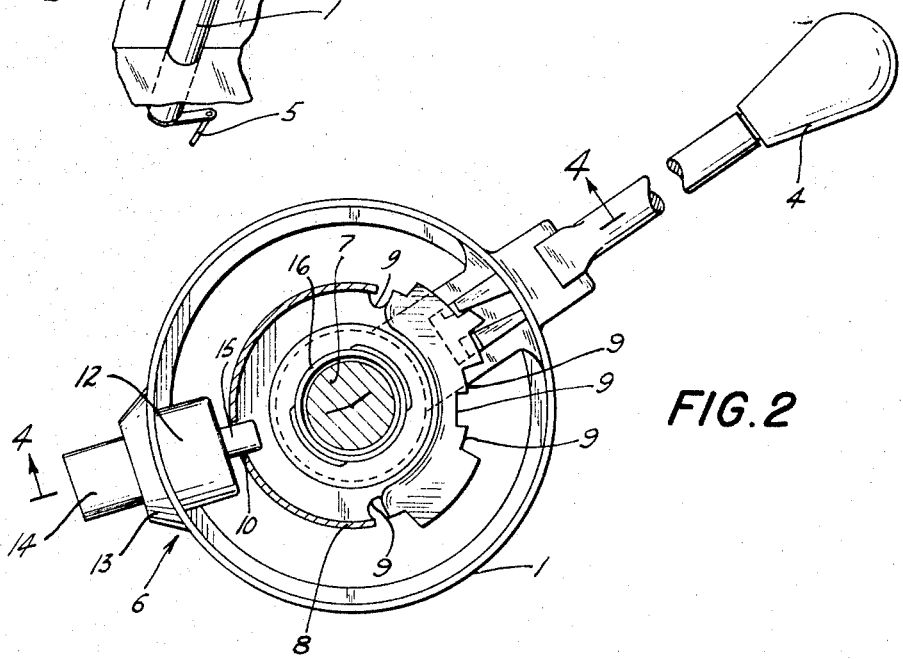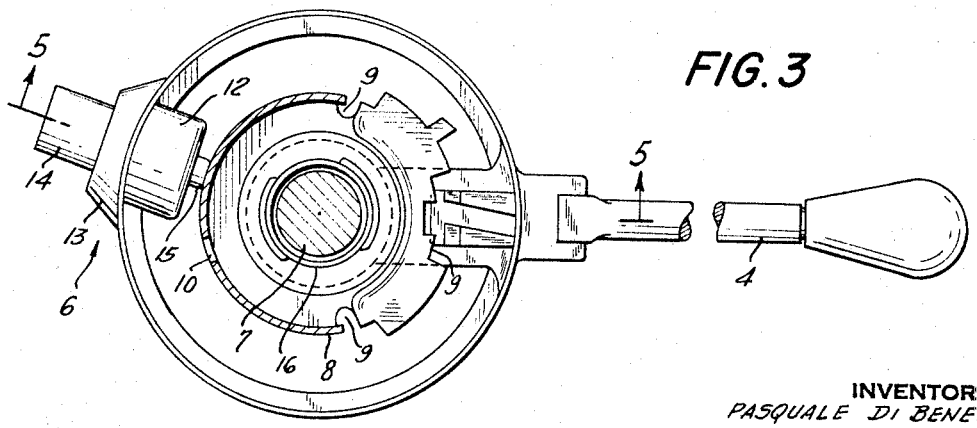

United States Patent Office 3,434,315
Patented Mar. 25, 1969

3,434,315
MECHANISM FOR LOCKING THE TRANSMISSION OF A MOTOR VEHICLE
Pasquale Di Benedetto, Manhasset, N.Y., assignor to Edward Di Benedetto, Upper Brookville, N.Y.
Filed Nov. 29, 1966, Ser. No. 597,680
Int. Cl. G05g 5/00; B60r 25/06
U.S. Cl. 70—202   1 Claim

ABSTRACT OF THE DISCLOSURE

A locking means for the transmission of a motor vehicle to prevent theft and accidental movement of that vehicle. A locking means which prevents motion of the gear selector assembly for an automatic or manual transmission of a motor vehicle.

Background of the invention

The problem of auto theft is a growing one. Even a locked ignition switch is not an absolute means of protection since methods are known for "jumping" the electrical connections in order to by-pass the ignition switch. Further, when the transmission is placed in a neutral position, the car can be noiselessly pushed or towed to a location where the "jumping" can be carried out with less danger of observation. A locking of the steering mechanism would not be a solution to the problem because it is illegal in many states.

A more fool-proof method of preventing motor vehicle theft would involve locking of the transmission. In that situation, even though the motor might be started by by-passing the ignition switch, the car could not be moved under its own power because of an inability to place the transmission in a suitable position. Even towing would become more difficult with at least the drive wheels locked. However, the means of locking the transmission must be so situated that the owner or other authorized driver can disengage the means employed for locking the transmission without undue difficulty.

The same considerations are involved when, as is often the case, a child is left in a motor vehicle while the adult driver must leave for a few moments to accomplish a particular task. Many cases are known where a child has accidentally placed the gear selector in a neutral position causing the car to roll with subsequent injury to the child and damage to the motor vehicle. Again, a means for locking the transmission to prevent this accidental movement would solve that problem.

Summary of the invention

In accordance with the present invention, I have found a means for locking the transmission of a motor vehicle which prevents movement of the gear selector assembly. The locking means is so situated and accessible within the vehicle that release of the locking means and movement of the gear selector assembly to a desired position is easily made by an authorized operator. In this invention, a lock cylinder is provided and the lock is attached to a means for preventing motion of the gear selector assembly when that selector is placed in an appropriate position. A key is then required to release the locking means, but this release is easily accomplished by an authorized operator because of the position of the lock cylinder.

Description of the drawings

In the accompanying drawings:
FIG. 1 is a view of the steering column of a motor vehicle with the steering wheel and gear selector lever;
FIG. 2 is a sectional view of the steering column along the line 2—2 of FIG. 1 with the top of the steering column and the steering wheel broken away, showing the locking means in locked position;
FIG. 3 is a view similar to FIG. 2 with the locking means in unlocked position.

Figure 4:
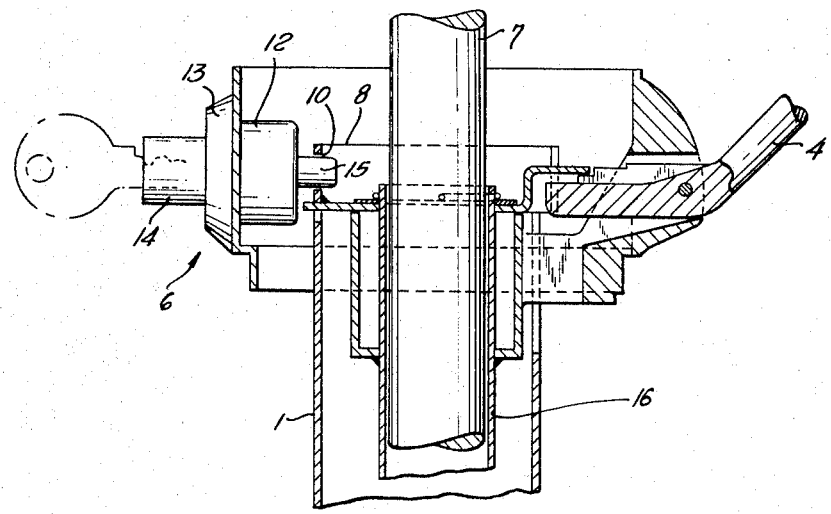
FIG. 4 is a transverse sectional view along line 4—4 of FIG. 2.

In the drawings there is illustrated a steering column 1 attached to the firewall 2 of a motor vehicle. At the top of the steering column is the steering wheel 3 and, attached to the side, is a gear selector 4. This selector is a portion of a gear selector assembly. The assembly includes, in addition, a cut-out flange 8, attached to the selector, a gear selector column 16, attached to the flange, and, in turn, connected to a lever 5 for controlling the positioning of the gears within the transmission. In general, the gear selector assembly is disposed substantially adjacent the steering column. The locking means 6 is shown attached to the steering column just below the steering wheel.

Within the steering column are a steering shaft 7 and the rotatable, cut-out flange 8 which is connected, through the gear selector column 16, to the lever 5. The various notches 9 in the flange act to stop the shift lever at the appropriate point for control of the transmission gears. In order to employ the locking means of the present invention, an extra opening 10 is formed in the flange.

The locking means comprises a lock body 12 within which the various tumblers or other lock control means are situated, a flange 13 for holding the locking means onto the steering column, a portion 14 for insertion of the key, and an engaging means 15 which engages the opening 10 formed in the flange. The engaging means is preferably, as shown, a solid, cylindrical plunger formed of metal. It can, however, be formed in other appropriate shapes, e.g. square, or of other appropriate materials.

In the position shown in FIG. 2, the gear selector is placed in such a position that the transmission is in "park." The locking means is so mounted on the steering column that the opening 10 in the flange is in alignment with the engaging means 15 when the gear selector is placed in "park" position. FIGS. 2 and 4 show the gear selector in the "park" position, such that the opening 10 and the engaging means 15 are in alignment, with the engaging means inserted through the opening so as to lock the position of the gear selector assembly and prevent further movement.

Figure 5:
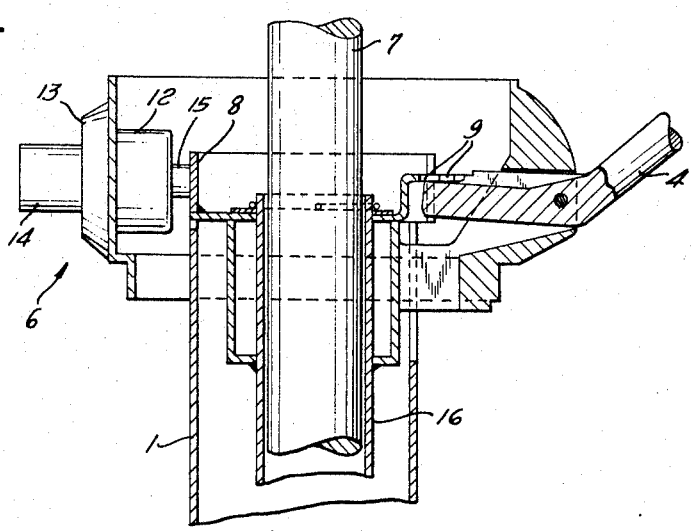
FIG. 5 is a view similar to FIG. 4, with the locking means in unlocked position, taken along the line 5—5 of FIG. 3.

When the engaging means is withdrawn from the opening, the gear selector can be moved to the various other gear positions as shown in FIGS. 3 and 5.

Description of the preferred embodiments

In operation, the gear selector is placed in the "park" position. The engaging means 15 is inserted through the opening 10, either automatically, because of spring loading of the engaging means, or manually by turning a key within the portion 14. When an authorized operator of the motor vehicle desires to again move that vehicle, he need merely insert the proper key into the portion 14 and retract the engaging means from the opening. The operator may then move the gear selector, start the engine in the normal manner, and proceed with driving the motor vehicle.

While the parts shown in the various figures relate, primarily, to an automatic transmission, the invention is obviously applicable to manual transmissions. For example, the opening can be formed in the post which connects the gear shift selector to the lever for connection to the transmission. This opening would be formed to be in alignment with a plunger when the shift selector is placed, for example, in the position for second or reverse. Thus, the position is employable even when the car is parked on a hill, whether facing up or down that hill.

Further, the system described in this invention is applicable to push-button transmission selectors and to selectors placed on the floor of the motor vehicle, such as the automatic transmission gear selector placed between the bucket seats of a sports car. In the former case, the "park" push button, itself, can be formed to act as the transmission locking means. With the floor selector, an opening can be formed in the gear selector assembly by adapting one of the linkages between the selector and the transmission for the opening. The locking means is so mounted that the engaging means is in alignment with this opening when the selector is in the "park" position.

Still further, the various portions of the shift mechanism can be formed of materials so that a break-away connection is made. For example, the shift selector can be formed of a relatively thin gauge material, strong enough to withstand the normal stresses of shifting, but weak enough so that it breaks when an attempt is made to force the shift with the locking means in place.

It is also apparent to those skilled in the art that the locking means for preventing unauthorized movement of the transmission can also be adapted to function as the ignition switch. Thus, proper movement of the key will not only act to retract the engaging means, but, also, to complete the electrical circuit so that the engine can be started.

In accordance with this invention, I have thus described a mechanism for more positively preventing the unauthorized movement of a motor vehicle comprising a locking means to prevent movement of the gear selector assembly and thus prevent engagement of the transmission. Thereby, an unauthorized person's ability to by-pass the ignition in order to remove a motor vehicle is rendered nugatory.

I claim:

1. In a motor vehicle of the type having a rotatable gear selector assembly below the steering wheel, the assembly having a gear selector portion which is concentric with the steering shaft of said vehicle, said shaft and gear selector portion being encased within a stationary hollow steering column, the improvement comprising a dish-shaped and notched gear selector which is moved by the handle of said assembly, an arcuate flange rigidly attached to said selector having an opening in a predetermined location in the side thereof, locking means including a body portion rigidly mounted on said column immediately below the steering wheel, engaging rod means which is adapted to move in a reciprocating manner in said body portion to lockingly engage said opening by protruding beyond the opening in the flange of said assembly, the rod means being of sufficient strength to create a resistance such that the gear selector lever will break away from the assembly and the flange remains locked if the lock is forced by the lever; said engaging rod means, gear shifting element and said opening being in alignment only when the gear selector is in the "park" position, and actuating means to shift said engaging means from a first inoperative position at which said gear selector assembly may be freely shifted throughout the range of drives to a second operative position at which said gear selector assembly is immovably locked in predetermined "park" position.

References Cited

UNITED STATES PATENTS

| | | | |
|---|---|---|---|
| 2,147,413 | 2/1939 | Sandberg | 70—254 |
| 2,679,744 | 6/1954 | Hildebrand | 70—202 |
| 2,890,581 | 6/1959 | Lewis | 70—248 |

FOREIGN PATENTS

| | | |
|---|---|---|
| 185,181 | 9/1963 | Sweden. |

MARVIN A. CHAMPION, *Primary Examiner.*

ROBERT L. WOLFE, *Assistant Examiner.*

U.S. Cl. X.R.

70—247